(12) United States Patent
Kuo

(10) Patent No.: US 9,531,485 B1
(45) Date of Patent: Dec. 27, 2016

(54) RF DEVICE AND POWER CONTROL PERFORMED THEREIN

(71) Applicant: Alpha Networks Inc., Hsinchu (TW)

(72) Inventor: Rong-Fa Kuo, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 0 days.

(21) Appl. No.: 15/269,035

(22) Filed: Sep. 19, 2016

Related U.S. Application Data

(63) Continuation-in-part of application No. 14/963,725, filed on Dec. 9, 2015, now Pat. No. 9,479,271.

(30) Foreign Application Priority Data

Jan. 8, 2015 (TW) .............................. 104100504 A

(51) Int. Cl.
  *H04B 17/00* (2015.01)
  *H04B 17/29* (2015.01)
  *H04B 17/15* (2015.01)

(52) U.S. Cl.
  CPC .............. *H04B 17/29* (2015.01); *H04B 17/15* (2015.01)

(58) Field of Classification Search
  CPC ......... H04B 17/19; H04B 17/17; H04B 17/23; H04B 17/29; H04W 52/52
  USPC ...................................................... 455/67.11
  See application file for complete search history.

(56) References Cited

U.S. PATENT DOCUMENTS

| | | | |
|---|---|---|---|
| 6,928,281 B2 | 8/2005 | Ward et al. | |
| 7,082,293 B1 * | 7/2006 | Rofougaran | H03L 7/0995 323/267 |
| 7,299,006 B1 * | 11/2007 | Rofougaran | H03D 3/244 323/267 |
| 7,558,556 B1 * | 7/2009 | Moloudi | H04B 1/40 323/267 |
| 8,472,883 B2 * | 6/2013 | Olesen | H04B 17/21 455/67.11 |
| 2005/0186917 A1 * | 8/2005 | Rofougaran | H03F 3/245 455/73 |

(Continued)

FOREIGN PATENT DOCUMENTS

| | | |
|---|---|---|
| EP | 2202704 | 6/2010 |
| TW | I260819 | 8/2006 |

OTHER PUBLICATIONS

Taiwan Patent Office "Search Report", Feb. 23, 2016, Taiwan.

*Primary Examiner* — April G Gonzales
(74) *Attorney, Agent, or Firm* — WPAT, PC; Justin King

(57) ABSTRACT

In an RF device, an RF circuit includes an RF circuit connector optionally coupling thereto an RF element for transmitting or receiving an RF signal; and a power supply module selectively outputting power to the RF circuit connector according to a control signal. In addition, a testing circuit includes a first filter unit having a first external terminal electrically coupled to a testing signal and a second external terminal electrically coupled to the RF circuit, wherein the first filter unit is configured to allow the testing signal to enter the RF circuit while blocking an RF signal transmitted in the RF circuit from entering the testing circuit; and a testing-result informing unit having an external input electrically coupled to the first external terminal, and determining contents of the control signal according to an electric level at the external input.

5 Claims, 6 Drawing Sheets

(56) References Cited

U.S. PATENT DOCUMENTS

| | | | |
|---|---|---|---|
| 2005/0186930 A1* | 8/2005 | Rofougaran | H03B 27/00 455/260 |
| 2007/0189413 A1* | 8/2007 | Huang | H03F 1/34 375/295 |
| 2008/0291113 A1* | 11/2008 | Ou-Yang | G01S 19/21 343/876 |

* cited by examiner

RF DEVICE AND POWER CONTROL PERFORMED THEREIN

FIELD OF THE INVENTION

The present invention relates to automatic power control of a radio frequency (RF) circuit, and more particularly to a self-testing RF device and an automatic power control method executed in a self-testing RF device.

BACKGROUND OF THE INVENTION

Conventional RF transmitting/receiving elements are generally classified into active RF elements which need power supply for driving internal amplifiers, and passive RF elements which do not need power supply. An antenna is taken as an example of an RF transmitting/receiving element. The performance of a passive antenna highly depends on the signal intensity of the RF source. In contrast, an active antenna has a one or two stages of low noise amplifier for amplifying weak RF signals, e.g. GPS signals. Therefore, problems of weak signals in a poor receiver and failed sensitivity can be remedied. In other words, active antennas, when compared with passive antennas, are better for weak signal operations.

However, to drive an amplifier requires a voltage higher than a certain level, so a power supply for the active antenna would be required for the normal operation of the active antenna. Generally, the active antenna power is turned on for link in wireless communication after the active antenna is settled at a proper location and connected to the RF circuit. If power is supplied to the active antenna before the active antenna is well mounted, short circuit might happen to damage the power supply system, or burn down the low noise amplifier in the active antenna. Therefore, it is necessary to operate the active antenna under precise control to avoid unexpected damage.

SUMMARY OF THE INVENTION

Therefore, the present invention provides a radio frequency (RF) device, which automatically monitors the status of an RF transmitter/receiver element to determine whether to supply power to the RF transmitter/receiver element or not.

The present invention further provides an automatic power control method, which readily tests whether an RF transmitter/receiver element is well installed to automatically control power supply according to the test result.

An aspect of the present invention relates to an RF device, which comprises an RF circuit and a testing circuit. The RF circuit comprises an RF circuit connector optionally coupling thereto an RF element for transmitting or receiving an RF signal; and a power supply module selectively outputting power to the RF circuit connector according to a control signal. The testing circuit comprises a first filter unit having a first external terminal electrically coupled to a testing signal and a second external terminal electrically coupled to the RF circuit, wherein the first filter unit is configured to allow the testing signal to enter the RF circuit while blocking an RF signal transmitted in the RF circuit from entering the testing circuit; and a testing-result informing unit having an external input electrically coupled to the first external terminal, and determining contents of the control signal according to an electric level at the external input. Wherein, the testing-result informing unit includes a rectifying unit and a DC detecting unit. The rectifying unit is electrically coupled to the external input for rectifying the electric level at the external input to output a rectified signal. The DC detecting unit is electrically coupled to the rectifying unit for receiving the rectified signal, and outputting the contents of the control signal according to the rectified signal. Furthermore, the DC detecting unit includes a switch element and a voltage drop element. The switch element has a control terminal receiving therefrom the rectified signal, a first path electrically coupled to an external output, and a second path electrically coupled to a first default electric level, wherein whether to conduct the electric path between the first path and the second path or not is determined according to the rectified signal. The voltage drop element has one terminal electrically coupled to a second default electric level and another terminal electrically coupled to the first path.

Another aspect of the present invention relates to an automatic power control method executed in the above described RF device. The automatic power control method comprises: comparing an electric level at the external input of the testing-result informing unit with at least one reference electric level to obtain a compared result; and determining the contents of the control signal according to the compared result.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
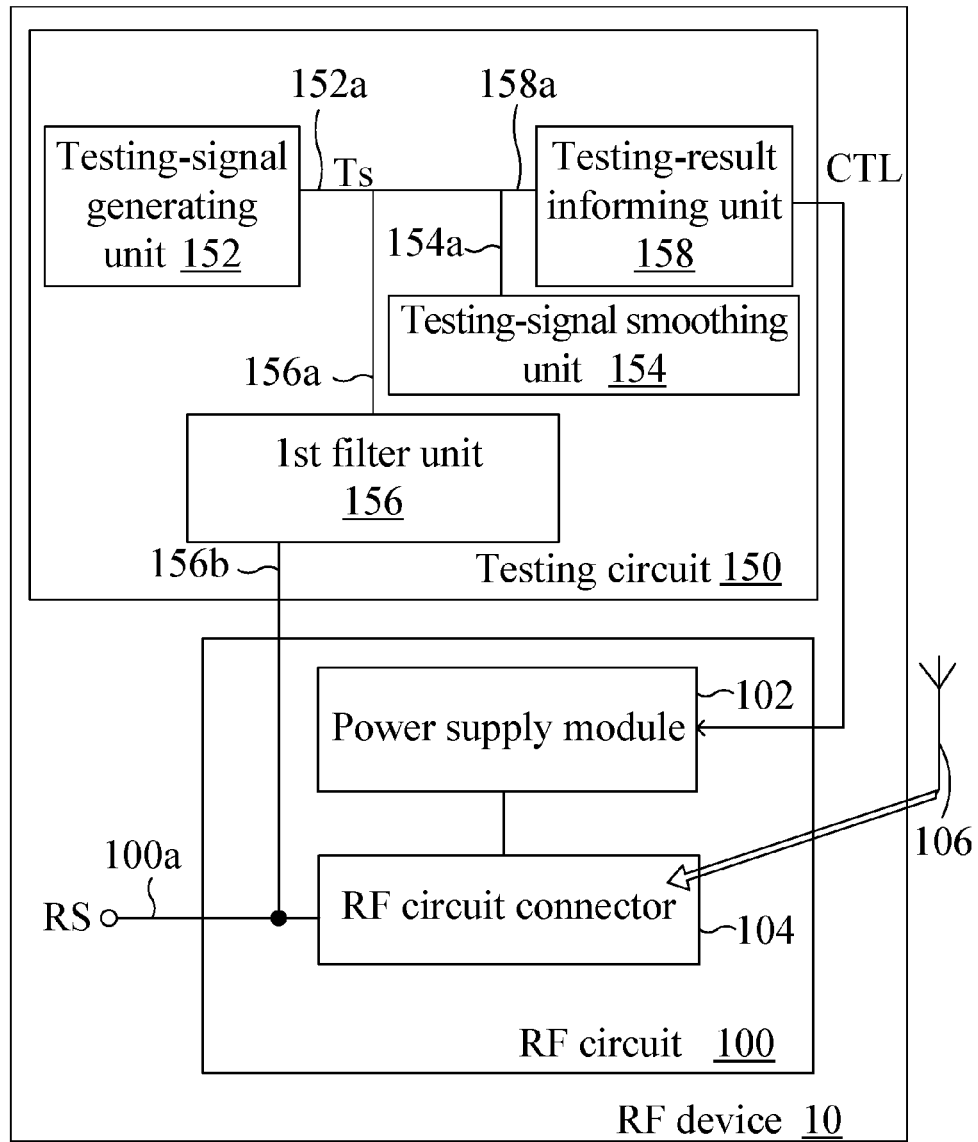
FIG. 1 is a schematic circuit block diagram of an RF device according to an embodiment of the present invention.

Please refer to FIG. 1, in which an embodiment of an RF device according to the present invention is shown. In this embodiment, the RF device 10 includes an RF circuit 100 and a testing circuit 150 performing a testing operation for determining an RF circuit characteristic of the RF device. The RF circuit 100 functions for receiving or transmitting RF signals. The RF circuit includes a power supply module 102 for providing power and an RF circuit connector 104. The testing circuit 150 includes a testing-signal generating unit 152, a testing-signal smoothing unit 154, a first filter unit 156 and a testing-result informing unit 158.

The RF circuit 100 receives a radiofrequency signal RS to be transmitted out via a connecting terminal 100a, or transmits the radiofrequency signal RS to other elements coupled to the circuit via the connecting terminal 100a. The radiofrequency signal RS to be transmitted out by the RF circuit 100 is transmitted wirelessly via an RF element 106. On the other hand, the radiofrequency signal RS received from the external to the RF element 106 is transmitted to the connecting terminal 100a via an RF circuit connector 104. The power supply module 102 determines whether to supply power to the RF circuit connector 104 according to a control signal CTL. The RF circuit connector 104 serves as a power transmission interface, and when the RF element 106 is an active RF element, transmits power received from the power supply module 102 to the RF element 106 coupled to the RF circuit connector 104 for the operation of the RF element 106.

The control signal CTL mentioned above is generated after the testing circuit 150 performs the testing operation for determining the RF circuit characteristic of the RF circuit 100, which will be described later. In response to the control signal CTL, the power supply module 102 duly supplies power to the active RF element 106, thereby preventing the active RF element 106 and the power supply system including the power supply module 102 from possible damage due to improper mounting.

The testing-signal generating unit 152 has a signal output 152a, from which a testing signal Ts is outputted, and then inputted to other elements of the testing circuit 150. The testing-signal smoothing unit 154 has a terminal 154a electrically coupled to the testing-signal generating unit 152 for receiving the testing signal Ts. The first filter unit 156 has an external terminal 156a, which is referred to as a first external terminal, and an external terminal 156b, which is referred to as a second external terminal, wherein the first external terminal 156a is electrically coupled to the terminal 154a of the testing-signal smoothing unit 154 and the signal output 152a so as to receive the testing signal Ts, while the second external terminal 156b is electrically coupled to a predetermined test point TP of the RF circuit 100. The testing-result informing unit 158 has an external input 158a, which is electrically coupled to the terminal 154a of the testing-signal smoothing unit 154, the signal output 152a, and the external terminal 156a. The testing-result informing unit 158 generates an informing signal, which is the control signal CTL in this embodiment, according to an electric level at the external input 158a.

In order to detect the electric characteristic of the RF circuit 100 for the RF signal RS transmitted or received in the normal operation, the above-described second external terminal 156b is electrically coupled to a test point TP between the RF circuit connector 104 and the connecting terminal 100a. Accordingly, whether the circuitry from the connecting terminal 100a to the RF circuit connector 104 and the circuitry connection inside the RF circuit connector 104 itself work normally can be checked. Moreover, when the active RF element 106 is coupled to the RF circuit connector 104, the electric characteristic of the active RF element 106 can also be tested. In other words, by way of the test, whether there is any RF element coupled to the RF circuit connector 104, whether the electric characteristic of the RF element is normal, and furthermore, whether the RF element is a standard assembly that could be equipped as the active RF element, can be determined. Optionally, the testing algorithm according to the present invention may further be used, with or without modification, for determining whether the RF element is an active RF element compatible with the RF circuit.

Preferably, the testing-signal generating unit 152 exhibits properties of a low output impedance voltage source or a high output impedance current source. The testing signal Ts may be a digital signal or it may include a digital signal. For example, the testing signal Ts may be continuously high, like a constant DC voltage. In other words, it is a digital signal, each bit of which is "1". In another example, the testing signal Ts may be continuously low, like a DC grounded voltage. In other words, it is a digital signal, each bit of which is "0". Alternatively, the testing signal Ts may be alternately high and low, like a middle or low frequency signal. In other words, it is a digital signal having alternate "1" and "0" bits, i.e. 1, 0, 1, 0, 1, 0 . . . Furthermore, a variety of digital signals having different duty cycles and/or waveforms can also be used as the testing signal. The waveforms, for example, may be but not limited to square waves, triangle waves or sine waves.

Furthermore, the first filter unit 156 exhibits properties of high impedance at high frequency and low impedance at middle or low frequency. The so-called high frequency indicates a specific band around the frequency of the radiofrequency signal, which is generally higher than about 300 MHz, and will be referred to as "high band" hereinafter. On the other hand, the so-called middle or low frequency indicates a specific test band around the frequency of the testing signal Ts generated by the testing-signal generating unit 152, which is generally lower than a quarter of the high band frequency, and will be referred to as "middle/low band" hereinafter. As such, during the operation of the radio-frequency (RF) circuit 100, the RF signal transmitted in the RF circuit 100a would not affect the operation of the testing circuit 150 due to the blocking effect of the first filter unit 156. In contrast, the first filter unit 156 will not block the testing signal Ts, so the RF circuit 100 serves one of the transmission paths of the testing signal Ts. Consequently, the impedance change of the RF circuit 100 will cause a change of an electric level of the testing circuit 150, e.g. the electric level received by the testing-result informing unit 158 through the external input 158a.

The testing-signal smoothing unit 154 used herein functions for temporary energy storage and wave filtration for smoothing the waveform of the testing signal passing therethrough. Depending on practical designs, the testing-signal smoothing unit 154 may stand alone or be incorporated into a filter unit of the testing circuit 150. Embodiments and examples will be given as follows for illustrating the designs and modifications.

Figure 2:
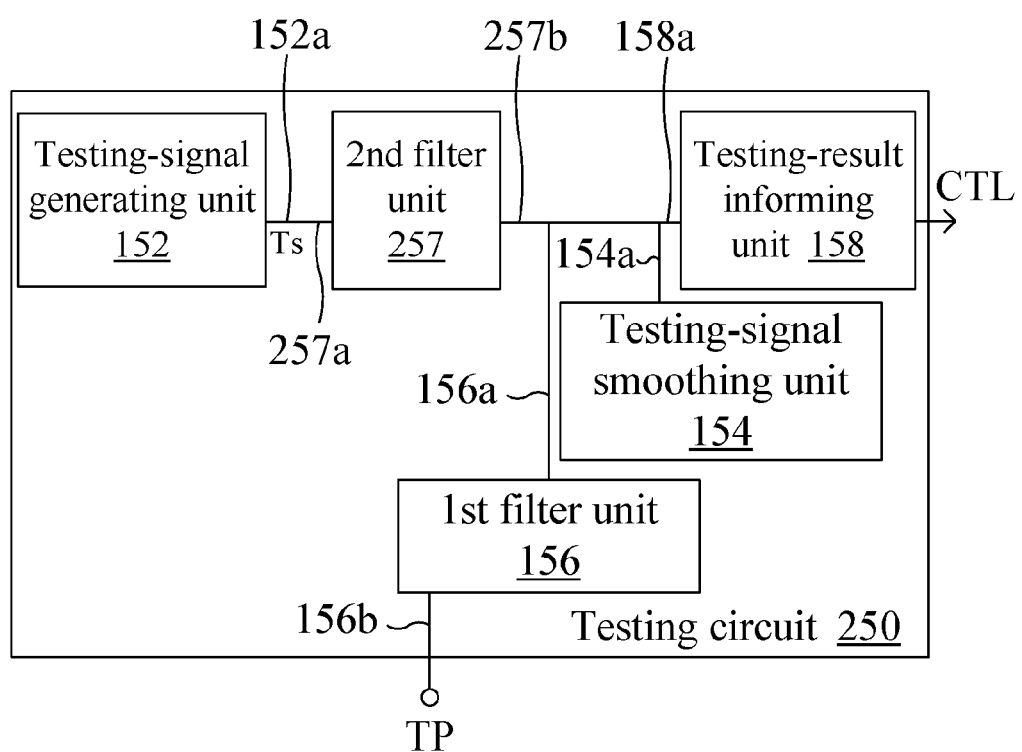
FIG. 2 is a schematic circuit block diagram illustrating an example of a testing circuit of an RF device according to another embodiment of the present invention.

Please refer to FIG. 2, which is a schematic circuit block diagram illustrating an example of a testing circuit of an RF device according to another embodiment of the present invention. Comparing the embodiment illustrated in FIG. 2 with that illustrated in FIG. 1, the testing circuit 250 shown in FIG. 2 includes a second filter unit 257. The second filter unit 257 is electrically coupled to the first filter unit 156 and the testing-signal generating unit 152, and has an external terminal 257a, which is referred to as a third external terminal, electrically coupled to the testing-signal generating unit 152 for receiving the testing signal Ts, and an external terminal 257b, which is referred to as a fourth external terminal, electrically coupled to the external terminal 156a of the first filter unit 156 and the external input 158a of the testing-result informing unit 158. The second filter unit 257 is capable of providing an improved high-frequency isolating effect for the testing-signal generating unit 152 so as to protect the operation of the testing-signal generating unit 152 from being affected by the RF signal transmitted in the high-power RF circuit 100a. The second filter unit 257 accomplishes the aforementioned objective with a required impedance effect in the specified high band. Preferably, the second filter unit 257 provides an impedance effect similar to or better than the first filter unit 156. From another viewpoint, both the first filter unit 156 and the second filter unit 257 can be low-pass filters or band-pass filters. Alternatively, they may be one low-pass filter and one band-pass filter. As long as the objectives can be achieved, it is not intended to limit the types of the filter units.

In addition to the abovementioned difference, the circuitry and operational principle of the testing circuit 250 are similar to the testing circuit 150 illustrated in FIG. 1, so they will not be redundantly described herein. It is to be noted that in spite a testing-signal generating unit is provided in each of the embodiments for generating a testing signal, the testing signal can alternatively be provided by an external device. Then there would be no need to dispose a testing-signal generating unit in the testing circuit or even in the RF circuit.

Figure 3:
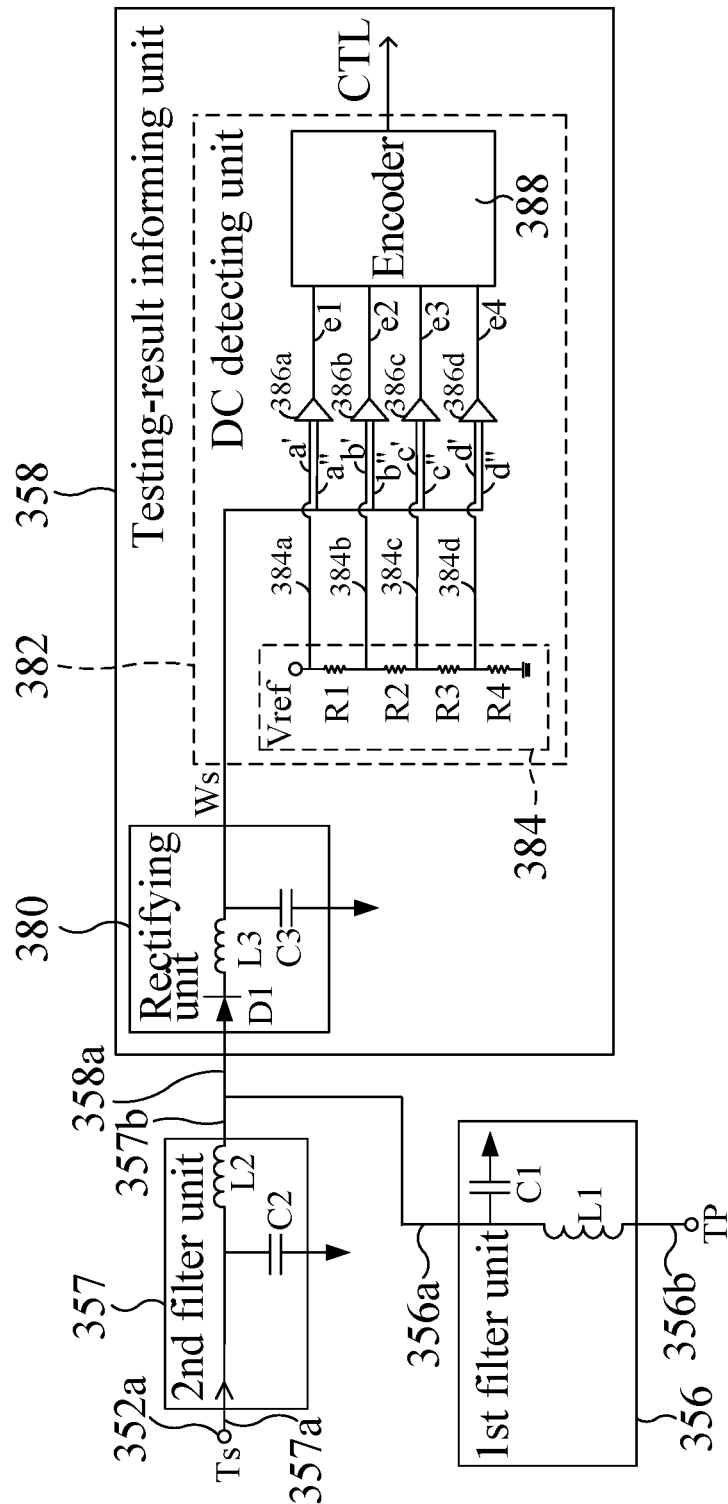
FIG. 3 is a circuit diagram illustrating another example of a testing circuit of an RF device according to another embodiment of the present invention.

For example, referring to FIG. 3, a circuit block diagram schematically illustrating an RF device according to another embodiment of the present invention is shown. In this embodiment, the testing circuit 35 mainly includes a signal output 352a, a first filter unit 356, a second filter unit 357 and a testing-result informing unit 358, and there is no independent testing-signal generating unit included in this embodiment of RF device. Instead, the signal output 352a is electrically coupled to an external testing-signal generating unit (not shown), from which the testing signal Ts is received and provided for the testing circuit 35.

In this embodiment, the first filter unit 356 includes an inductor L1 and a capacitor C1. The inductor L1 has one terminal electrically coupled to the external terminal 356b and then to a testing point TP of the RF circuit (not shown). Another terminal of the inductor L1, i.e. the external terminal 356a of the first filter unit 356, one terminal of the capacitor C1, the external terminal 357b of the second filter unit 357 and the external input 358a of the testing-result informing unit 358 are electrically coupled to one another. Another terminal of the capacitor C1 is electrically coupled to ground. The second filter unit 357 includes an inductor L2 and a capacitor C2. One terminal of the inductor L2, i.e. the external terminal 357a of the second filter unit 357, is electrically coupled to the signal input 352a and one terminal of the capacitor C2. Another terminal of the inductor L2, i.e. the external terminal 357b of the second filter unit 357, is electrically coupled to the external input 358a of the testing-result informing unit 358 and the external terminal 356a of the first filter unit 356. Another terminal of the capacitor C2 is electrically coupled to ground.

Figure 4:
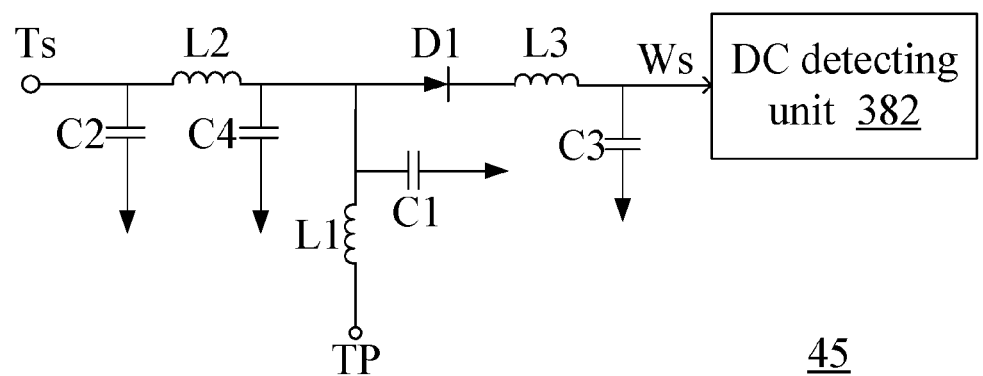
FIG. 4 is a circuit diagram illustrating a further example of a testing circuit of an RF device according to another embodiment of the present invention.

Herein, the capacitors C1 and C2 work together as the testing-signal smoothing unit 154 as shown in FIG. 1. That is, the capacitors C1 and C2 work together to provide temporary energy-storing and wave-filtering effects for providing a direct-current (DC) bias signal required by the testing-result informing unit 358 at a subsequent stage. Another alternative example of the RF device is illustrated in FIG. 4, in which an additional capacitor C4 is included in the testing circuit 45, compared to the testing circuit 35. In the embodiment as illustrated in FIG. 4, the capacitor C4 functions like the testing-signal smoothing unit 154. That is, the capacitor C4 works to provide temporary energy-storing effect for providing a direct-current (DC) bias signal required by the testing-result informing unit 358 at a subsequent stage. Of course, the capacitors C1 and C2 also provide temporary energy-storing and wave-filtering effects. By adjusting the capacitance of the independent capacitor C4, a level of the direct-current (DC) bias signal required by the testing-result informing unit 358 at a subsequent stage can be changed without changing the wave-filtering effect.

Please refer to FIG. 3 again. As shown, the testing-result informing unit 358 in this embodiment includes a rectifying unit 380 and a DC detecting unit 382. The rectifying unit 380 is electrically coupled to the external input 358a, performs a rectifying operation for the electric level at the external input 358a, and outputs a corresponding rectified DC signal Ws. The DC detecting unit 382 is electrically coupled to the rectifying unit 380, receives the rectified signal Ws, and determines the contents of the control signal CTL to be outputted by the testing-result informing unit 358 according to the rectified signal Ws.

In this embodiment, the rectifying unit 380 includes a diode D1, an inductor L3 and a capacitor C3. The anode of the diode D1 is electrically coupled to the external input 358a, and the cathode is electrically coupled to one terminal of the inductor L3. Another terminal of the inductor L3 is electrically coupled to one terminal of the capacitor C3, and another terminal of the capacitor C3 is grounded. The DC detecting unit 382 includes a voltage divider 384, a plurality of comparator 386a~386d and an encoder 388. It is to be noted that although a half-wave rectifier is exemplified as the rectifying unit in the above embodiments, as understood by those skilled in the art, another type of rectifying unit such as a full-wave rectifier or a bridge rectifier, can be used in the embodiments in lieu of the half-wave rectifier.

The voltage divider 384 has a first operational voltage input terminal Vref and a plurality of partial voltage output terminals 384a~384d. For making respective voltage values provided through the partial voltage output terminals 384a~384d different from one another, resistors R1~R4 are serially connected between the first operational voltage input terminal Vref and the ground in the voltage divider 384. Meanwhile, partial voltages are provided from coupling points between respective pairs of adjacent resistors to the partial voltage output terminals 384a~384d.

The comparators 386a~386d have respective reference input terminals a'~d', comparative input terminals a"~d" and comparative output terminals e1~e4. In more detail, the reference input terminal a' of the comparator 386a is electrically coupled to the corresponding partial voltage output terminal 384a, the rectifying signal Ws is received through the comparative input terminal a", and a compared result between the voltage at the partial voltage output terminal 384a and the voltage of the rectifying signal Ws is provided from the comparator 386a to the encoder 388 via the comparative output terminal e1. Likewise, the reference input terminal b' of the comparator 386b is electrically coupled to the corresponding partial voltage output terminal 384b, the rectifying signal Ws is received through the comparative input terminal b", and a compared result between the voltage at the partial voltage output terminal 384b and the voltage of the rectifying signal Ws is provided from the comparator 386b to the encoder 388 via the comparative output terminal e2. The reference input terminal c' of the comparator 386c is electrically coupled to the corresponding partial voltage output terminal 384c, the rectifying signal Ws is received through the comparative input terminal c", and a compared result between the voltage at the partial voltage output terminal 384c and the voltage of the rectifying signal Ws is provided from the comparator 386c to the encoder 388 via the comparative output terminal e3. The reference input terminal d' of the comparator 386d is electrically coupled to the corresponding partial voltage output terminal 384d, the rectifying signal Ws is received through the comparative input terminal d", and a compared result between the voltage at the partial voltage output terminal 384d and the voltage of the rectifying signal Ws is provided from the comparator 386d to the encoder 388 via the comparative output terminal e4.

In an initial test, the settings of the comparators 386a~386d are adjusted by properly adjusting resistance correlation among the resistors R1~R4. The encoders 388 then obtains desired compared results for determination of the contents of the control signal CTL according to the settings of the comparators 386a~386d and the rectifying signal Ws. In other words, the comparators 386a~386d are properly set and adjusted to have the control signal CTL meet the variable conditions of the RF circuit 100. Alternatively, the contents of the control signal CTL generated by the encoder 388 may be determined according to the compared results, which are inputted to the encoder 388 corresponding to different conditions of the RF circuit 100 based on default values of other comparators. It is to be noted that this alternative way is adapted for a condition that similar tests have been made and accuracy has been assured. For example, it is suitable for a batch test during mass production, or for a maintenance test after being sold to a user.

Generally, the duty cycle of the testing signal Ts varies with the RF circuits to be tested. A proper testing signal Ts would make it possible to differentiate the rectifying signals Ws resulting from a normal RF circuit or an abnormal RF circuit, thereby generating differentiable contents of the control signal CTL. Accordingly, whether the impedance of the tested RF circuit is normal can be determined based on the contents of the control signal CTL.

Hereinafter, several conditions are given as examples to adjust the testing signal Ts until it is proper to differentiate contents of the control signal CTL. The conditions include Condition 1: the RF circuit operates normally, a normal active RF element is coupled to the RF circuit, and power is being supplied; Condition 2: the RF circuit operates normally, a normal active RF element is coupled to the RF circuit, and power is not supplied, wherein Condition 2 further includes Condition 2-1: a normal active RF element is coupled to the RF circuit, no power is supplied, and the RF circuit operates normally; Condition 2-2: a normal active RF element is coupled to the RF circuit, no power is supplied, and short-circuit situation occurs in the RF circuit; and Condition 2-3: a normal active RF element is coupled to the RF circuit, no power is supplied, and open-circuit situation occurs in the RF circuit; Condition 3: the RF circuit operates normally, and a normal passive RF element is coupled to the RF circuit; and Condition 4: the RF circuit operates normally, and no external RF element is coupled to the RF circuit.

In Condition 1, a preliminary test is performed to the RF circuit with the designated testing signal Ts, provided that the RF circuit operates normally, a normal active RF element is coupled to the RF circuit, and power is being supplied, to obtain a specific sequence, hereinafter a first sequence, according to a sequence of the compared results outputted from the comparators. For example, the compared results respectively outputted from the sequentially allocated comparators 386a, 386b, 386c and 386d are combined in order so as to constitute the first sequence.

In Condition 2, a preliminary test is performed to the RF circuit with the designated testing signal Ts, provided that the RF circuit operates normally, a normal active RF element is coupled to the RF circuit, and power is not supplied, to obtain a specific sequence, hereinafter a second sequence, according to the same sequence of the compared results as in Condition 1.

In Condition 2-1, a preliminary test is performed to the RF circuit with the designated testing signal Ts, provided that a normal active RF element is coupled to the RF circuit, no power is supplied, and the RF circuit operates normally, to obtain a specific sequence, hereinafter a first sub-sequence, according to the same sequence of the compared results as in Condition 1.

In Condition 2-2, a preliminary test is performed to the RF circuit with the designated testing signal Ts, provided that a normal active RF element is coupled to the RF circuit, no power is supplied, and short-circuit situation occurs in the RF circuit, to obtain a specific sequence, hereinafter a second sub-sequence, according to the same sequence of the compared results as in Condition 1.

In Condition 2-3, a preliminary test is performed to the RF circuit with the designated testing signal Ts, provided that a normal active RF element is coupled to the RF circuit, no power is supplied, and open-circuit situation occurs in the RF circuit, to obtain a specific sequence, hereinafter a third sub-sequence, according to the same sequence of the compared results as in Condition 1.

In condition 3, a preliminary test is performed to the RF circuit with the designated testing signal Ts, provided that the RF circuit operates normally, and a normal passive RF element is coupled to the RF circuit, to obtain a specific sequence, hereinafter a third sequence, according to the same sequence of the compared results as in Condition 1 or 2.

In condition 4, a preliminary test is performed to the RF circuit with the designated testing signal Ts, provided that the RF circuit operates normally, and no external RF element is coupled to the RF circuit, to obtain a specific sequence, hereinafter a fourth sequence, according to the same sequence of the compared results as in any of the preceding conditions. Furthermore, since there is no external RF element coupled to the RF circuit, the RF circuit is supposed to be open-circuit. Therefore, Condition 4 is adapted to test if the RF circuit is open-circuit.

The testing signal Ts is adjustable in order to have the compared results outputted by the comparators comply with specific sequences, e.g. 0001, 0101, etc. Accordingly, the contents of the control signal CTL can be differentiated in response to the properly adjusted testing signal Ts.

Alternatively, the compared results outputted by the comparators may be made to comply with specific sequences by adjusting the DC bias voltage of the testing-result informing unit 358 or the arrangement of the resistors R1~R4, instead of adjusting the testing signal Ts. For example, a part or all of the resistors R1~R4 are variable resistors. Once a specific condition is complied with so as to generate the first sequence, the second sequence, which could substantially be the first, second or third sub-sequence, the third sequence or the fourth sequence based on the compared results in the four examples, respectively, the specific condition can be used for subsequent tests, and the first sequence, the second sequence, which could substantially be the first, second or third sub-sequence, the third sequence or the fourth sequence can be used as references to analyze subsequent compared results of the comparators.

By way of the above-described matching rules, a condition of the RF circuit can be determined. Meanwhile, an electric connection state of the RF circuit under a specific condition can also be determined. If it is determined that the RF circuit is not successfully connected, or there is no active RF element connected, a corresponding control signal CTL will be issued to control the power supply module not to supply power. In addition, alarm means can be activated in response to the control signal CTL. For example, the alarm means may be, but not limited to, lighting or sound.

Figure 5:
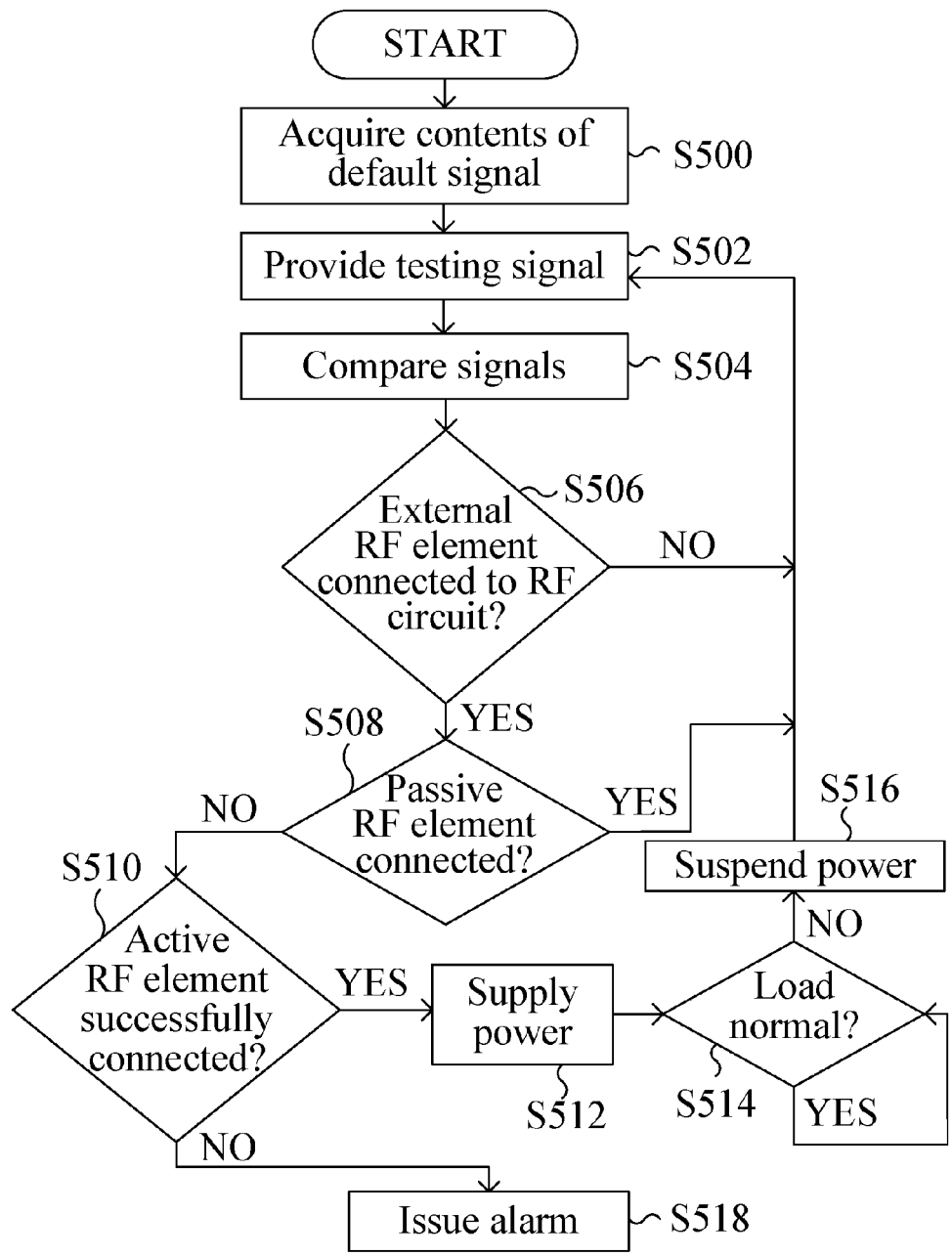
FIG. 5 is a flowchart schematically illustrating an automatic power control method of an RF device according to an embodiment of the present invention.

Hereinafter, a testing method according to the present invention is described with reference to the flowchart shown in FIG. 5, as well as the circuit blocks shown in FIGS. 1 and 3.

First of all, in Step S500, contents of a default signal is acquired. During the first test, a result derived from a theoretical electric characteristic can be used as the contents of the default signal. Alternatively, a real test result, e.g. the first sequence, the second sequence, which could substantially be the first, second or third sub-sequence, the third sequence or the fourth sequence as mentioned above, may be used as the contents of the default signal. The default signal can be stored in any suitable position of the RF device. For example, it can be stored in the testing circuit 150, and specifically, in the testing-signal generating unit 152 or the testing-result informing unit 158 to be readily provided for subsequent comparing operations.

After the contents of the default signal are acquired, the testing signal can be provided (Step S502) and signal comparison can be conducted (Step S504). In this embodiment, whether a load, e.g. an external RF element, is connected to the RF circuit is determined first by detecting whether the RF circuit is open-circuit according to the Condition 4 test, i.e. using the fourth sequence as reference. If it is determined that an external RF element is connected to the RF circuit in Step S506, Step S508 is executed. Otherwise, the flow returns to Step S502 to restart next test. In an alternative embodiment, a prompt signal indicating that the connection of an external RF element to the RF circuit may be additionally issued once the connection of an external RF element to the RF circuit is determined.

In Step S508, whether the external RF element coupled to the RF circuit is a passive RF element is determined by detecting whether compared results in the RF circuit conform to the Condition 3 test result. If it is determined that the external RF element coupled to the RF circuit is a passive RF element, suspend power supply. That is, no power supply would be conducted. The flow returns to Step S502 to restart next test. If it is determined that the external RF element coupled to the RF circuit is not a passive RF element, the flow proceeds to Step S510 for further discrimination.

In Step S510, whether a normal active RF element is successfully coupled to the RF circuit as a load is determined by detecting whether compared results in the RF circuit conform to the Condition 2 test result. If it is determined in Step S510 that the electric characteristic shows successful connection of an active RF element to the RF circuit, i.e. the compared results conform to the Condition 2-1 test result, the flow proceeds to Step S512 and power supply to the load is activated. Practically, the power is supplied to the RF circuit connector and then transmitted to the active RF element via the RF circuit connector. Afterwards, the flow proceeds to Step S514 to perform further signal comparison to determine if the coupled active RF element 106 is inserted into the RF circuit connector, i.e. the load of the RF circuit 100 is a normal load of the RF circuit 100. It can be determined by comparing the real time compared results of the comparators 386a~386d with the compared results allocated as the first sequence on Condition 1. If it is determined in Step S514 that the load is abnormal, which means that some problem occurs in the coupled active RF element 106, the power supply will be suspended immediately (Step S516). The active RF element 106 should be tuned or replaced, and then the flow goes back to Step S502 to test again. In contrast, if it is determined in Step S514 that the load is normal, Step S514 is repeated to perform continuous tests.

Refer to Step S510 again. If it is determined in Step S510 that the compared results do not conform to the Condition 2-1 test result but conform to the Condition 2-2 or 2-3 test result, it means that the coupled load is neither a passive RF element nor a successfully connected active RF element, and the flow proceeds to Step S518 to issue an alarm indicating a mounting problem of the external RF element. Optionally, accompanying the alarm, the flow further goes back to Step S502 for next test. It is to be noted that if the compared results show failed connection between the active RF element and the RF circuit over and over even if the connecting status has been checked and fixed, it might be reasonably inferred that the active RF element itself is abnormal instead of connecting failure between the active RF element and the RF circuit.

It is to be noted that the above-described specific embodiments are given for illustration only, and those skilled in the art may, for example, adjust the sequence of the steps depending on practical requirement. Since equivalent ways to achieve similar objectives of the present invention are various, they would not be described herein. For example, when power is suspended in Step S516, an alarm may be issued to notify the operator to adjust load. Power supply in Step S512 may be executed after the adjustment of load, and then next test can be performed. In a further example, an alarm may be issued to notify that power supply is starting when the flow proceeds to Step S512. Therefore, the flow as illustrated in FIG. 5 is not for restricting the implementation of the present invention, but just one of the alternatives provided for the reference of those skilled in the art to practice the present invention.

Figure 6:
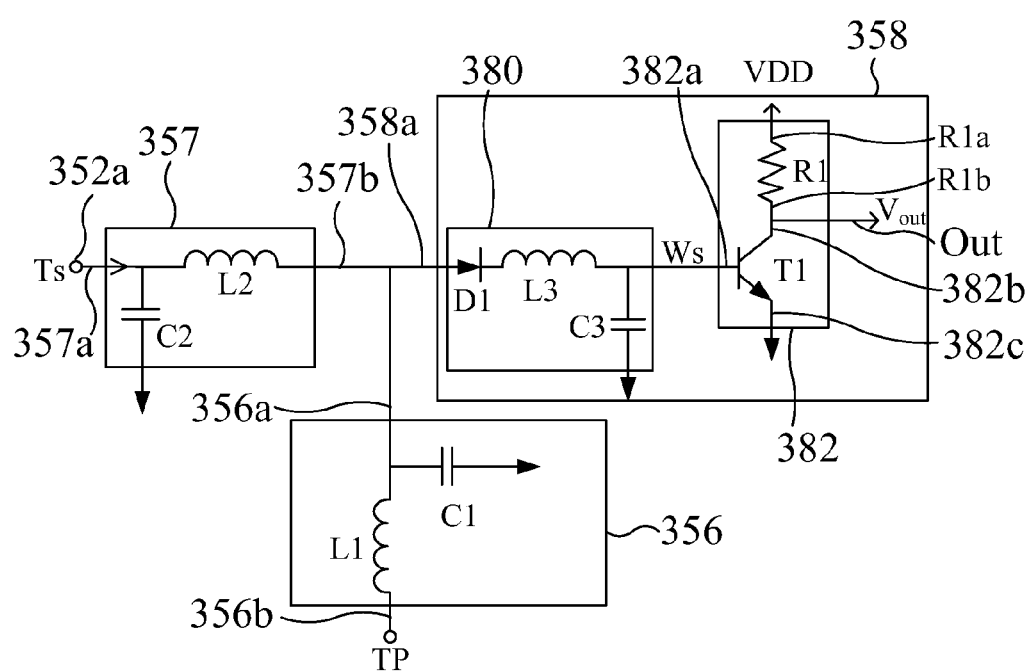
FIG. 6 is a circuit block diagram schematically illustrating an RF device according to another embodiment of the present invention.

Please refer to FIG. 6, a circuit block diagram schematically illustrating an RF device according to another embodiment of the present invention is shown. In this embodiment, some elements are the same as those in FIG. 3, and are labeled by the same reference numerals and are not described again here. A major difference between the embodiments shown in FIG. 3 and FIG. 6 is that the DC detecting unit 382 includes a transistor T1 and a resistor R1. The resistor R1 functions for voltage drop, and may be replaced with another passive or active element, e.g. transistor or MOSFET. A control terminal 382a of the transistor T1 is electrically coupled to both the inductor L3 and the capacitor C3 of the rectifying unit 380, through which the rectified signal Ws from the rectifying unit 380 is received to determine whether to conduct the electric path between a first path 382b and a second path 382c. The second path 382c is grounded, and the first path 382b, as well as the terminal R1b of the resistor R1, is electrically coupled to the external output Out, where an output electric level Vout is outputted by the testing-result informing unit 358 as the informing signal. Another terminal R1a of the resistor R1 is electrically coupled to the working voltage VDD.

In this embodiment, the transistor T1 is used as a switch element, and any other suitable switch element can be used as a replacement, depending on practical requirements.

For testing different RF circuit characteristics, the duty cycle of the testing signal may need to be adaptively adjusted. With the specifically designed testing signal Ts, if the impedance of the RF circuit is normal, the rectified signal Ws, which includes the DC bias voltage, is able to drive the transistor T1 to be enabled, and if the impedance is abnormal, the transistor T1 cannot be enabled by the rectified signal Ws. Accordingly, whether the impedance of the RF circuit to be tested is normal as designed can be determined according to the output electric level Vout. For example, if the transistor T1 is successfully enabled in response to the rectified signal Ws, the RF circuit is determined to be normal, and on the other hand, if the transistor T1 cannot be enabled with the rectified signal Ws, the RF circuit is determined to be abnormal, e.g. short circuit. Whether the transistor T1 is successfully enabled or not can be realized according to the output electric level Vout. A low level, e.g. approximating ground level in this example, detected at the external output indicates a conductive state, and a high level, e.g. approximating working level VDD in this example, detected at the external output indicates a non-conductive state. The condition of the RF circuit can thus be readily discriminated by detecting the output electric level Vout.

In another embodiment, the testing-result informing unit 358 does not include the DC detecting unit 382. In this case, the rectified signal Ws is directly used for providing the contents of the informing signal. In other words, by coupling the rectified signal Ws to an analog-to-digital converter (not shown), the testing-result informing unit 358 may give the output of the analog-to-digital converter as the informing signal. Optionally, lighting alarm, sounding alarm or any other suitable type of alarm may accompany the informing signal.

According to the present invention, an RF circuit can execute testing operations during normal work. The testing operation can be readily conducted by referring to the impedance change of the RF circuit caused by the testing signal. Therefore, no matter what type of RF element is coupled to the RF circuit, whether the RF circuit enters an abnormal operational status, e.g. open circuit or short circuit, can be easily determined. Furthermore, by monitoring the electric characteristics of the circuit, possible damages to the active RF element and the power supply system caused by improper installation can be effectively avoided.

In view of the foregoing, the present invention is advantageous in the following aspects. First of all, switching between a built-in RF element and an external RF element can be automatically performed. Once the electric connection of an external RF element to the RF circuit is detected, the testing circuit automatically detects the circuit condition of the external RF element. A transmission path through the external RF element will be automatically selected if the circuit condition of the external RF element is normal. In contrast, a transmission path through the built-in RF element will be selected and an alarm signal will be optionally issued if the circuit condition of the external RF element is abnormal. In addition, a test according to the present invention can be applied to an RF circuit with or without power supply, and the test can be performed while the RF circuit is working. If there is any installation failure, it can be detected in the test. Furthermore, the test can be applied to RMA (Return Merchandise Authorization), assembling quality test in the manufacturing process of the RF circuit, and so on. The test according to the present invention does not need any expensive precision instrument. Instead, it can be conducted by way of digital control and switching of the RF circuit.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An RF device, comprising:

an RF circuit, comprising:

an RF circuit connector optionally coupling thereto an RF element for transmitting or receiving an RF signal; and a power supply module selectively outputting power to the RF circuit connector according to a control signal; and a testing circuit, comprising:

a first filter unit having a first external terminal electrically coupled to a testing signal and a second external terminal electrically coupled to the RF circuit, wherein the first filter unit is configured to allow the testing signal to enter the RF circuit while blocking an RF signal transmitted in the RF circuit from entering the testing circuit; and a testing-result informing unit having an external input electrically coupled to the first external terminal, and determining contents of the control signal according to an electric level at the external input, wherein, the testing-result informing unit includes:

a rectifying unit electrically coupled to the external input for rectifying the electric level at the external input to output a rectified signal; and a DC detecting unit electrically coupled to the rectifying unit for receiving the rectified signal, and outputting the contents of the control signal according to the rectified signal, wherein, the DC detecting unit includes:

a switch element having a control terminal receiving therefrom the rectified signal, a first path electrically coupled to an external output, and a second path electrically coupled to a first default electric level, wherein whether to conduct the electric path between the first path and the second path or not is determined according to the rectified signal; and a voltage drop element having one terminal electrically coupled to a second default electric level and another terminal electrically coupled to the first path.

2. The RF device according to claim 1, wherein the testing circuit further comprises:

a second filter unit having a third external terminal electrically coupled to the testing signal and a fourth external terminal electrically coupled to the first external terminal of the first filter unit.

3. The RF device according to claim 1, further comprising:

a testing-signal generating unit for generating and providing the testing signal.

4. The RF device according to claim 1, further comprising:

a testing-signal smoothing unit having one terminal electrically coupled to the testing signal and the first external terminal of the first filter unit.

5. An automatic power control method executed in the RF device as claimed in claim 1, comprising:

comparing an electric level at the external input of the testing-result informing unit with at least one reference electric level to obtain a compared result; and determining the contents of the control signal according to the compared result.

\* \* \* \* \*